(12) United States Patent
De Flaviis et al.

(10) Patent No.: US 10,062,965 B2
(45) Date of Patent: Aug. 28, 2018

(54) RAISED ANTENNA PATCHES WITH AIR DIELECTRICS FOR USE IN LARGE SCALE INTEGRATION OF PHASED ARRAY ANTENNA PANELS

(71) Applicant: Movandi Corporation, Newport Beach, CA (US)

(72) Inventors: Franco De Flaviis, Irvine, CA (US); Seunghwan Yoon, Irvine, CA (US)

(73) Assignee: Movandi Corporation, Newport Beach, CA (US)

( * ) Notice: Subject to any disclaimer, the term of this patent is extended or adjusted under 35 U.S.C. 154(b) by 36 days.

(21) Appl. No.: 15/488,355

(22) Filed: Apr. 14, 2017

(65) Prior Publication Data

US 2018/0108989 A1    Apr. 19, 2018

Related U.S. Application Data

(60) Provisional application No. 62/408,211, filed on Oct. 14, 2016, provisional application No. 62/410,778, filed on Oct. 20, 2016.

(51) Int. Cl.

| H01Q 3/26 | (2006.01) |
| H01Q 21/00 | (2006.01) |
| H01Q 3/24 | (2006.01) |
| H04B 7/204 | (2006.01) |
| H01Q 21/06 | (2006.01) |
| H04B 7/04 | (2017.01) |
| H04B 7/0408 | (2017.01) |

(52) U.S. Cl.
CPC ............. *H01Q 3/2658* (2013.01); *H01Q 3/24* (2013.01); *H01Q 21/0006* (2013.01); *H01Q 21/065* (2013.01); *H04B 7/0408* (2013.01); *H04B 7/2041* (2013.01)

(58) Field of Classification Search
None
See application file for complete search history.

(56) References Cited

U.S. PATENT DOCUMENTS

| 6,329,649 B1* | 12/2001 | Jack ........................... G01J 5/20 |
| | | 250/250 |
| 8,102,325 B2* | 1/2012 | Feller ....................... H01Q 1/42 |
| | | 343/757 |
| 9,231,311 B2* | 1/2016 | Tiezzi ...................... H01Q 3/26 |
| 2018/0090814 A1* | 3/2018 | Yoon .................... H01Q 1/2283 |
| 2018/0145421 A1* | 5/2018 | Yoon .................... H01Q 1/2283 |

* cited by examiner

Primary Examiner — Howard Williams
(74) Attorney, Agent, or Firm — Farjami & Farjami LLP

(57) ABSTRACT

A phased array antenna panel includes an array of antenna cells. Optionally, the phased array antenna panel includes a frame with multiple shielding fences housing the array of antenna cells. Each antenna cell includes a raised antenna patch with air dielectric. In one example, the raised antenna patch may include four outwardly increasing widths, and four supporting legs, each of the four supporting legs situated between a pair of adjacent projections. A first differential feed port may be coupled to first and second supporting legs of the raised antenna patch through first and second transformers, and a second differential feed port may be coupled to third and fourth supporting legs of the raised antenna patch through third and fourth transformers. A return loss in a frequency range of between 27.5 GHz and 29.5 GHz of each antenna cell is less than about −10 dB.

20 Claims, 14 Drawing Sheets

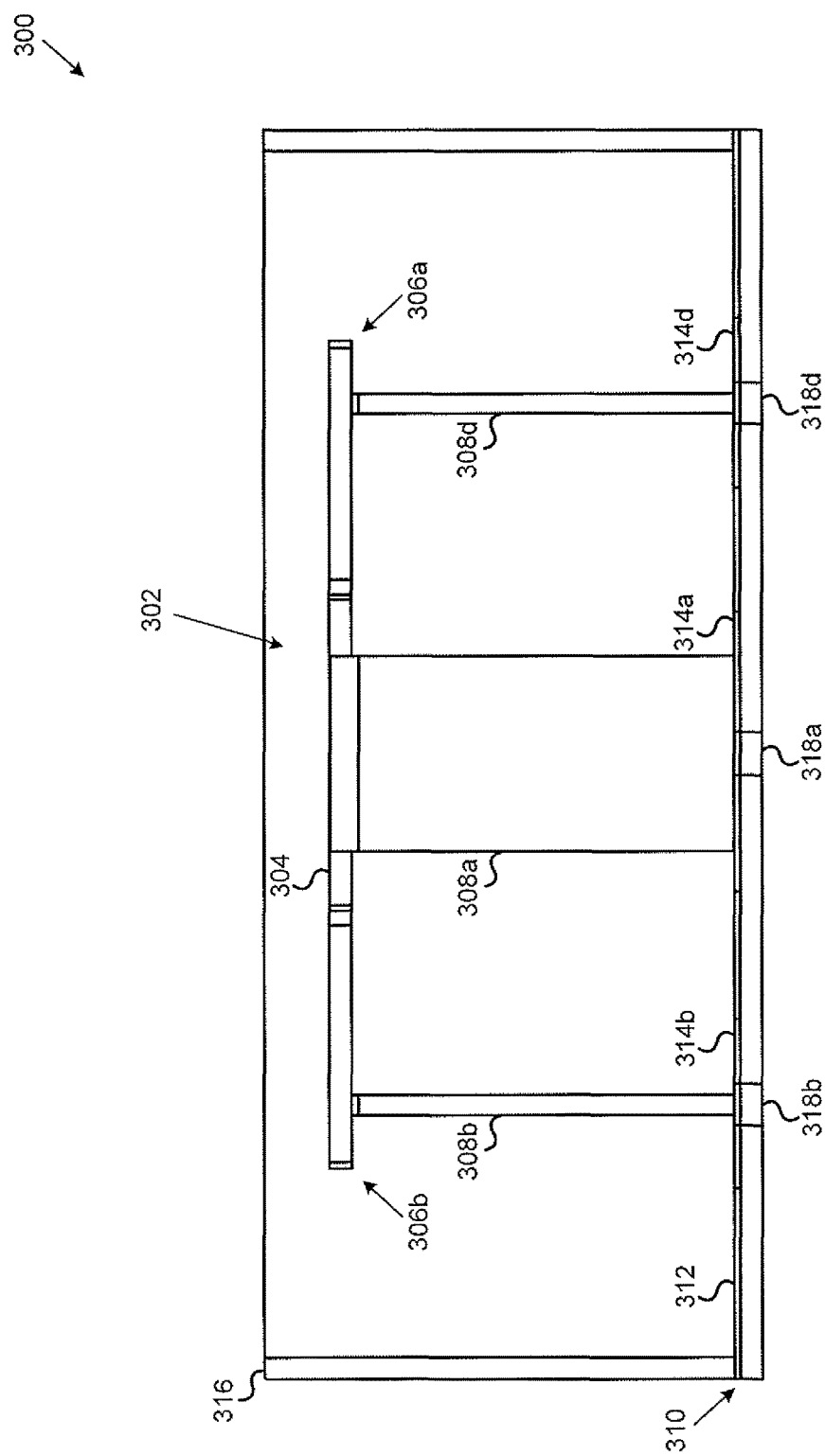

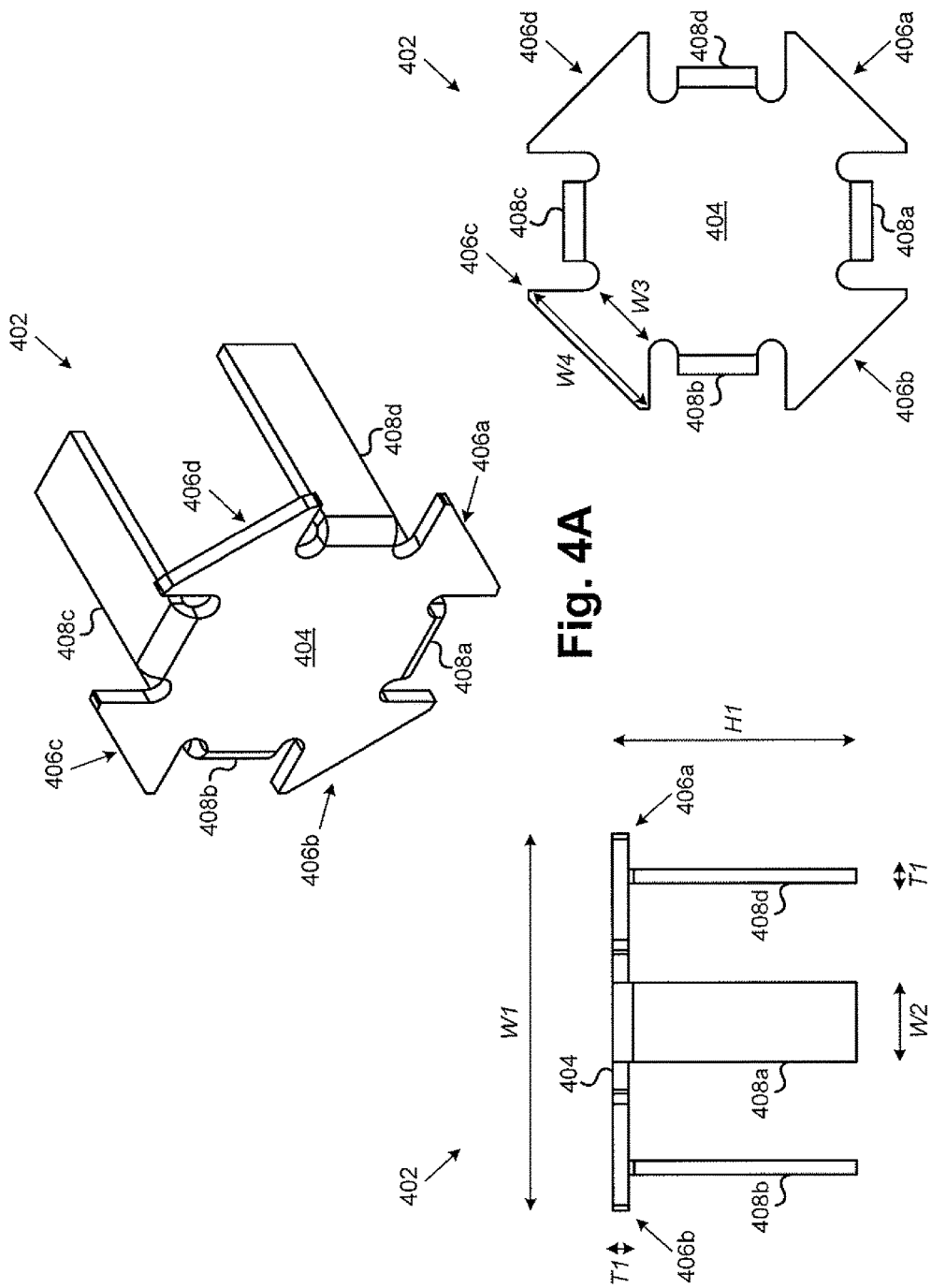

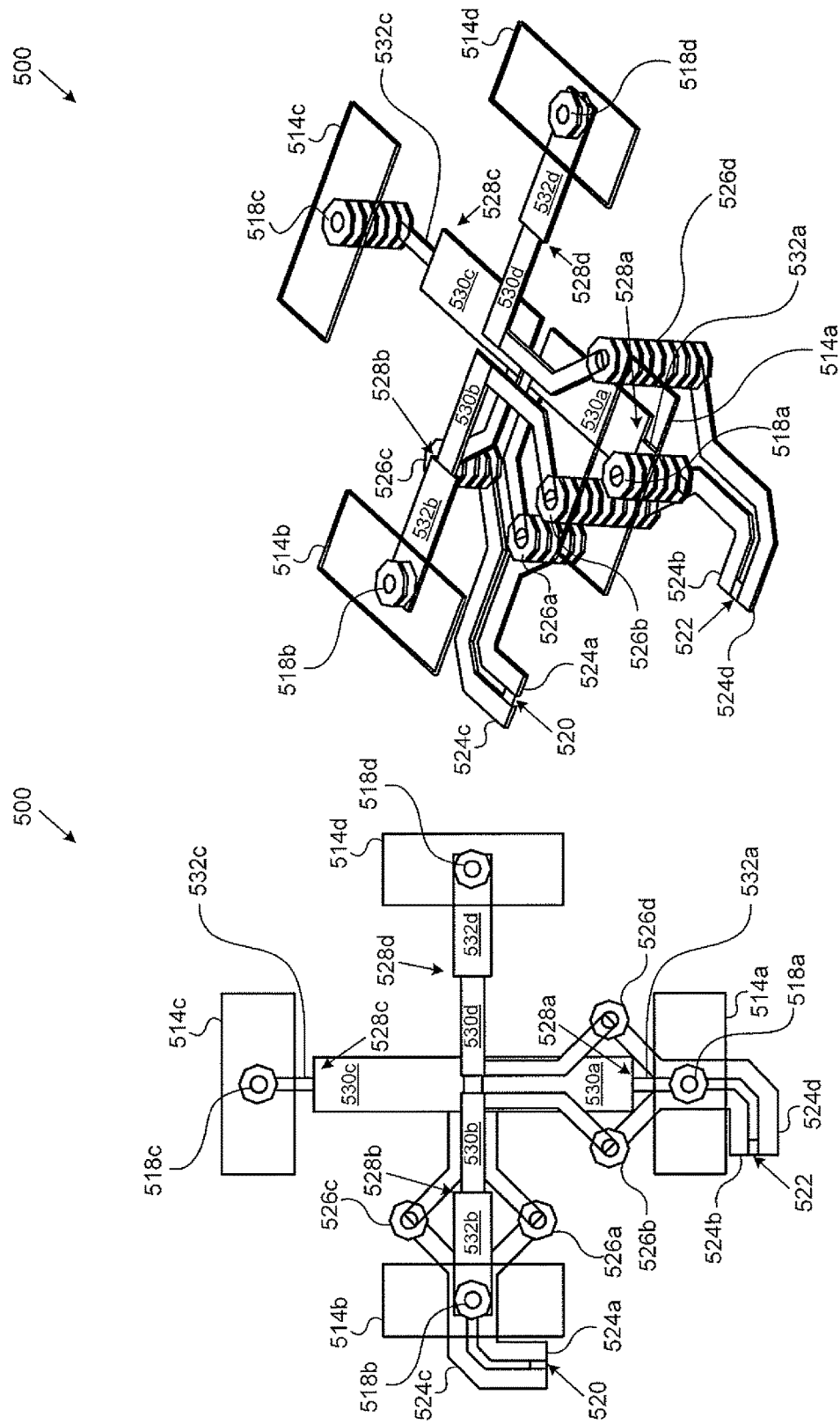

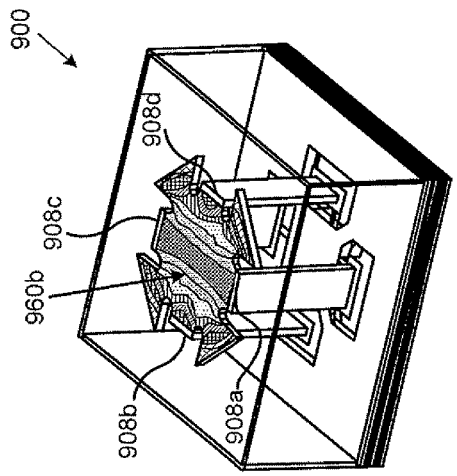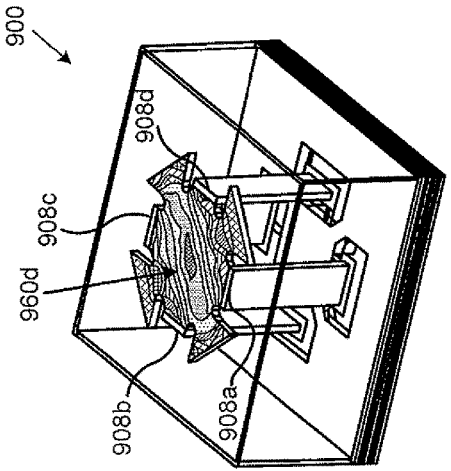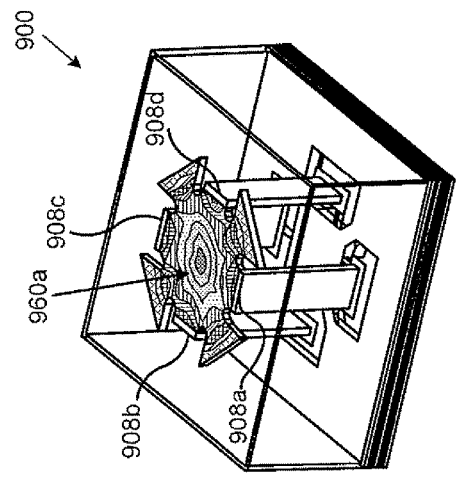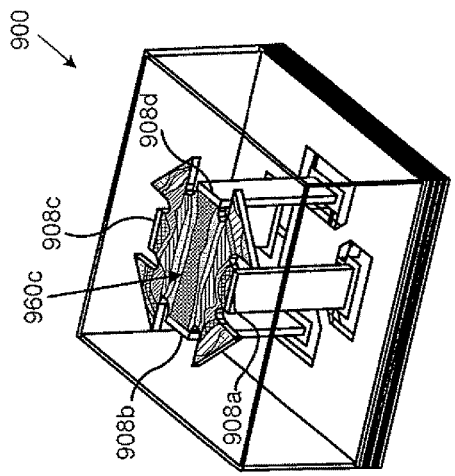

RAISED ANTENNA PATCHES WITH AIR DIELECTRICS FOR USE IN LARGE SCALE INTEGRATION OF PHASED ARRAY ANTENNA PANELS

CLAIMS OF PRIORITY

The present application claims the benefit of and priority to a provisional application entitled "Antenna Patches with Air Dielectrics and Flat Microstrip Patches for Use in Large Scale Integration of Phased Array Antenna Panels," Ser. No. 62/408,211 filed on Oct. 14, 2016, and to a provisional application entitled "Antenna Patches with Air Dielectrics and Flat Microstrip Patches for Use in Large Scale Integration of Phased Array Antenna Panels," Ser. No. 62/410,778 filed on Oct. 20, 2016. The disclosures of these provisional applications are hereby incorporated fully by reference into the present application.

RELATED APPLICATION(S)

The present application is related to U.S. patent application Ser. No. 15/225,071, filed on Aug. 1, 2016, and titled "Wireless Receiver with Axial Ratio and Cross-Polarization Calibration," and U.S. patent application Ser. No. 15/225,523, filed on Aug. 1, 2016, and titled "Wireless Receiver with Tracking Using Location, Heading, and Motion Sensors and Adaptive Power Detection," and U.S. patent application Ser. No. 15/226,785, filed on Aug. 2, 2016, and titled "Large Scale Integration and Control of Antennas with Master Chip and Front End Chips on a Single Antenna Panel," and U.S. patent application Ser. No. 15/255,656, filed on Sep. 2, 2016, and titled "Novel Antenna Arrangements and Routing Configurations in Large Scale Integration of Antennas with Front End Chips in a Wireless Receiver," and U.S. patent application Ser. No. 15/256,038 filed on Sep. 2, 2016, and titled "Transceiver Using Novel Phased Array Antenna Panel for Concurrently Transmitting and Receiving Wireless Signals," and U.S. patent application Ser. No. 15/256,222 filed on Sep. 2, 2016, and titled "Wireless Transceiver Having Receive Antennas and Transmit Antennas with Orthogonal Polarizations in a Phased Array Antenna Panel," and U.S. patent application Ser. No. 15/278,970 filed on Sep. 28, 2016, and titled "Low-Cost and Low-Loss Phased Array Antenna Panel," and U.S. patent application Ser. No. 15/279,171 filed on Sep. 28, 2016, and titled "Phased Array Antenna Panel Having Cavities with RF Shields for Antenna Probes," and U.S. patent application Ser. No. 15/279,219 filed on Sep. 28, 2016, and titled "Phased Array Antenna Panel Having Quad Split Cavities Dedicated to Vertical-Polarization and Horizontal-Polarization Antenna Probes," and U.S. patent application Ser. No. 15/335,034 filed on Oct. 26, 2016, and titled "Lens-Enhanced Phased Array Antenna Panel," and U.S. patent application Ser. No. 15/335,179 filed on Oct. 26, 2016, and titled "Phased Array Antenna Panel with Configurable Slanted Antenna Rows," and U.S. patent application Ser. No. 15/355,967 filed on Nov. 18, 2016, and titled "Phased Array Antenna Panel with Enhanced Isolation and Reduced Loss," and U.S. patent application Ser. No. 15/356,172 filed on Nov. 18, 2016, and titled "Phased Array Antenna Panel Having Reduced Passive Loss of Received Signals," and U.S. patent application Ser. No. 15/432,018 filed on Feb. 14, 2017, and titled "Outphasing Transmit and Receive Wireless Systems Having Dual-Polarized Antennas," and U.S. patent application Ser. No. 15/432,091 filed on Feb. 14, 2017, and titled "Outphasing Transmitters with Improved Wireless Transmission Performance and Manufacturability," and U.S. patent application Ser. No. 15/432,185 filed on Feb. 14, 2017, and titled "Multi-Beam Outphasing Transmitters." The disclosures of all of these related applications are hereby incorporated fully by reference into the present application.

BACKGROUND

Phased array antenna panels with large numbers of antennas integrated on a single board are being developed in view of higher wireless communication frequencies being used in the evolving 5G wireless communications (5th generation mobile networks or 5th generation wireless systems). Phased array antenna panels are capable of beamforming by phase shifting and amplitude control techniques, and without physically changing direction or orientation of the phased array antenna panels, and without a need for mechanical parts to effect such changes in direction or orientation.

However, impaired antenna impedance matching during scanning or beamforming results in increased return loss, defined as ratio of power returned from an antenna to power delivered to the antenna. Additionally, it is desirable for a phased array antenna panel to have a large bandwidth. However, forming antennas on printed circuit boards (PCBs) introduces mutual coupling, and reduces bandwidth. Presently known techniques to increase bandwidth rely on increased substrate thickness to provide a greater height (or separation) between an overlying plate and an underlying ground plane. Thicker substrates are more expensive and also behave as wave guiding structures, adversely affecting radiation of radio frequency (RF) waves from the antennas, resulting in decreased radiation and therefore lower efficiency.

Thus, there is a need in the art to use phased array antenna panels to achieve wireless communication systems that overcome the deficiencies in the art.

SUMMARY

The present disclosure is directed to raised antenna patches with air dielectrics for use in large scale integration of phased array antenna panels, substantially as shown in and/or described in connection with at least one of the figures, and as set forth in the claims.

BRIEF DESCRIPTION OF THE DRAWINGS

FIG. 3 illustrates a side view of an exemplary antenna cell according to one implementation of the present application.

FIGS. 4A, 4B, and 4C illustrate a perspective view, a side view, and a top view, respectively of an exemplary raised antenna patch according to one implementation of the present application.

FIGS. 5A and 5B illustrate a top view and a perspective view respectively of an exemplary matching network according to one implementation of the present application.

FIGS. 9A, 9B, 9C, and 9D illustrate various perspective views and field distributions of an exemplary antenna cell operating at its fundamental mode according to one implementation of the present application.

DETAILED DESCRIPTION

Figure 1:
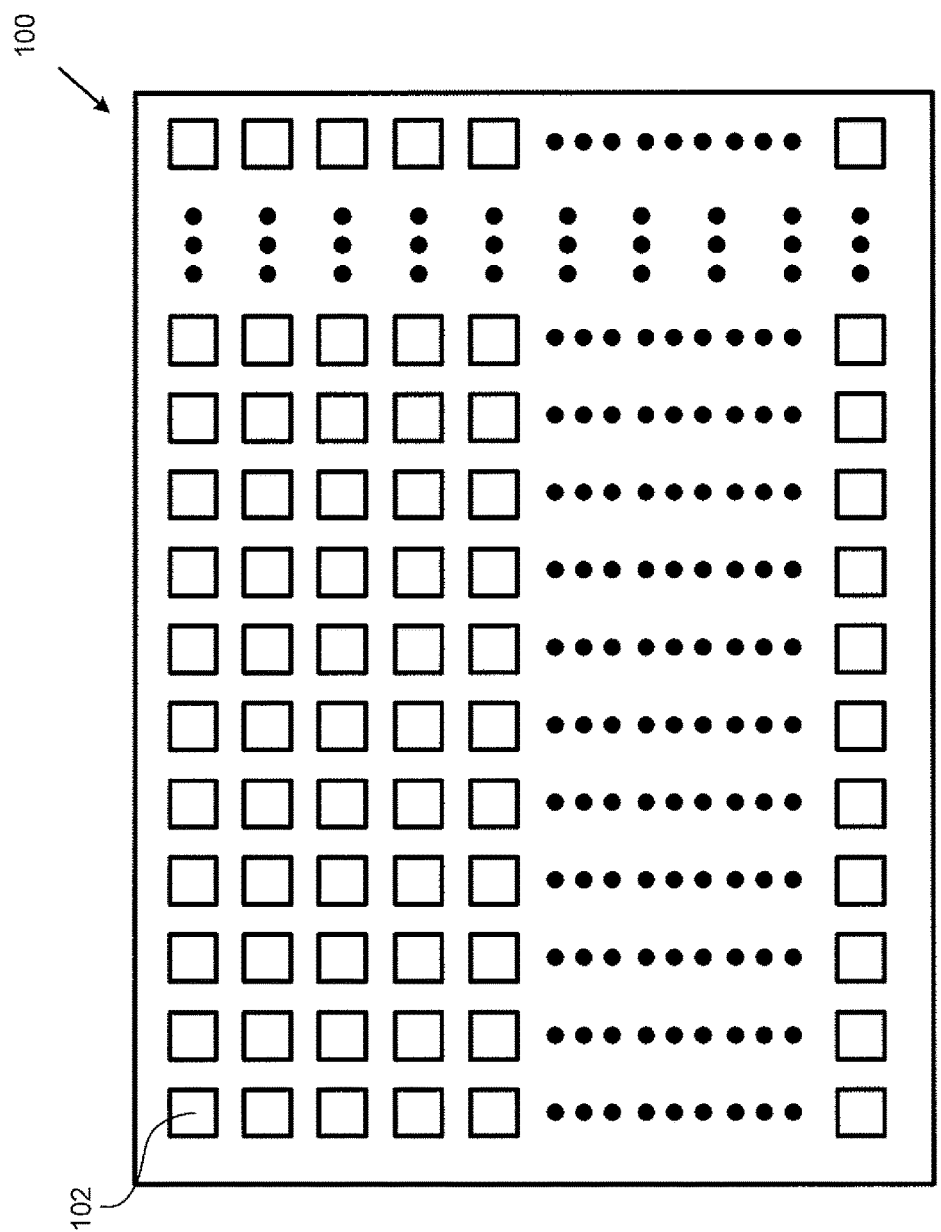
FIG. 1 illustrates a top plan view of a portion of a phased array antenna panel according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a top plan view of a portion of a phased array antenna panel according to one implementation of the present application. As illustrated in FIG. 1, phased array antenna panel 100 includes a plurality of antennas 102. In one implementation, antennas 102 may be used in conjunction with 5G wireless communications (5th generation mobile networks or 5th generation wireless systems). In another implementation, antennas 102 may be used in conjunction with commercial geostationary communication satellites or low earth orbit satellites. In one implementation, for a wireless transmitter transmitting signals at 28.5 GHz (i.e., $\lambda=10.52$ mm), each antenna 102 may need an area of at least a half wavelength (i.e., $\lambda/2=5.26$ mm) by a half wavelength (i.e., $\lambda/2=5.26$ mm). As illustrated in FIG. 1, antennas 102 in phased array antenna panel 100 may each have a square shape having dimensions of 5.26 mm by 5.26 mm, for example. In one implementation, each adjacent pair of antennas 102 may be separated by a larger distance. In practice, for example when used in conjunction with 5G wireless communications, phased array antenna panel 100 may have one hundred and forty four (144) antennas 102. When used in conjunction with commercial geostationary communication satellites or low earth orbit satellites, phased array antenna panel 100 may be even larger, and have, for example, between two thousand and four thousand (2,000-4,000) antennas 102. In other examples, a phased array antenna panel may have any other number of antennas 102.

In general, the gain of phased array antenna panel 100 improves with the number of antennas 102.

In the present implementation, phased array antenna panel 100 is a flat panel array employing antennas 102 coupled to associated active circuits to form beams for transmission. In one implementation, the beams are formed fully electronically by means of phase and amplitude control circuits associated with antennas 102. An example of beam forming using phase and amplitude control circuits utilizing a phased array antenna panel is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel 100 can provide fully electronic beamforming without the use of mechanical parts.

Figure 2A:
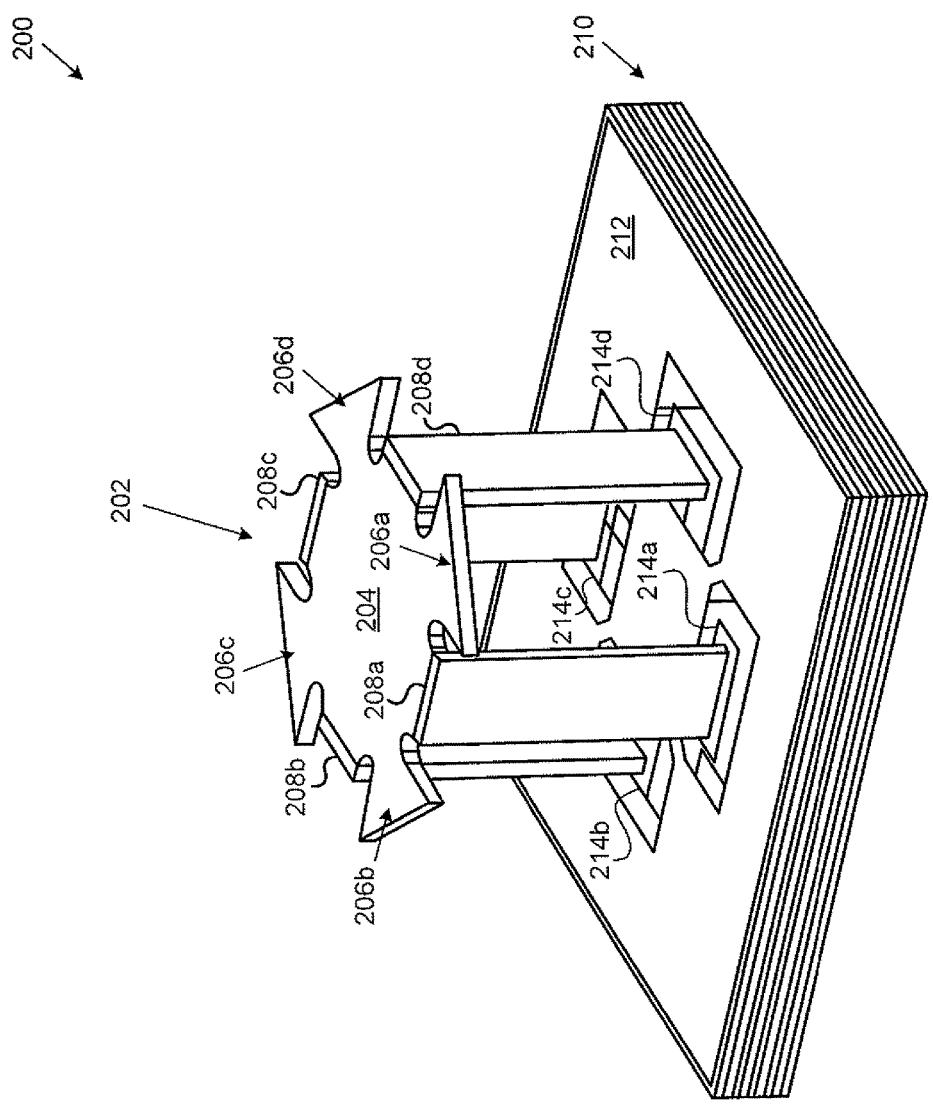
FIG. 2A illustrates a perspective view of an exemplary antenna cell according to one implementation of the present application.

FIG. 2A illustrates a perspective view of an exemplary antenna cell according to one implementation of the present application. As illustrated in FIG. 2A, antenna cell 200 includes raised antenna patch 202, having top plate 204 with projections 206a, 206b, 206c, and 206d, and supporting legs 208a, 208b, 208c, and 208d. Antenna cell 200 also includes substrate 210, ground plate 212, and pads 214a, 214b, 214c, and 214d. Use of antenna cell 200 in a phased array antenna panel, such as phased array antenna panel 100 in FIG. 1, results in improved matching conditions, scan range, and bandwidth. The improved matching conditions over scan angle, scan range, and bandwidth are attributed to factors such as the shape of raised antenna patch 202, for example the projections 206a, 206b, 206c, and 206d, and the use of air as dielectric to obtain the desired height of raised antenna patch 202 at low cost, as discussed below.

Figure 2B:
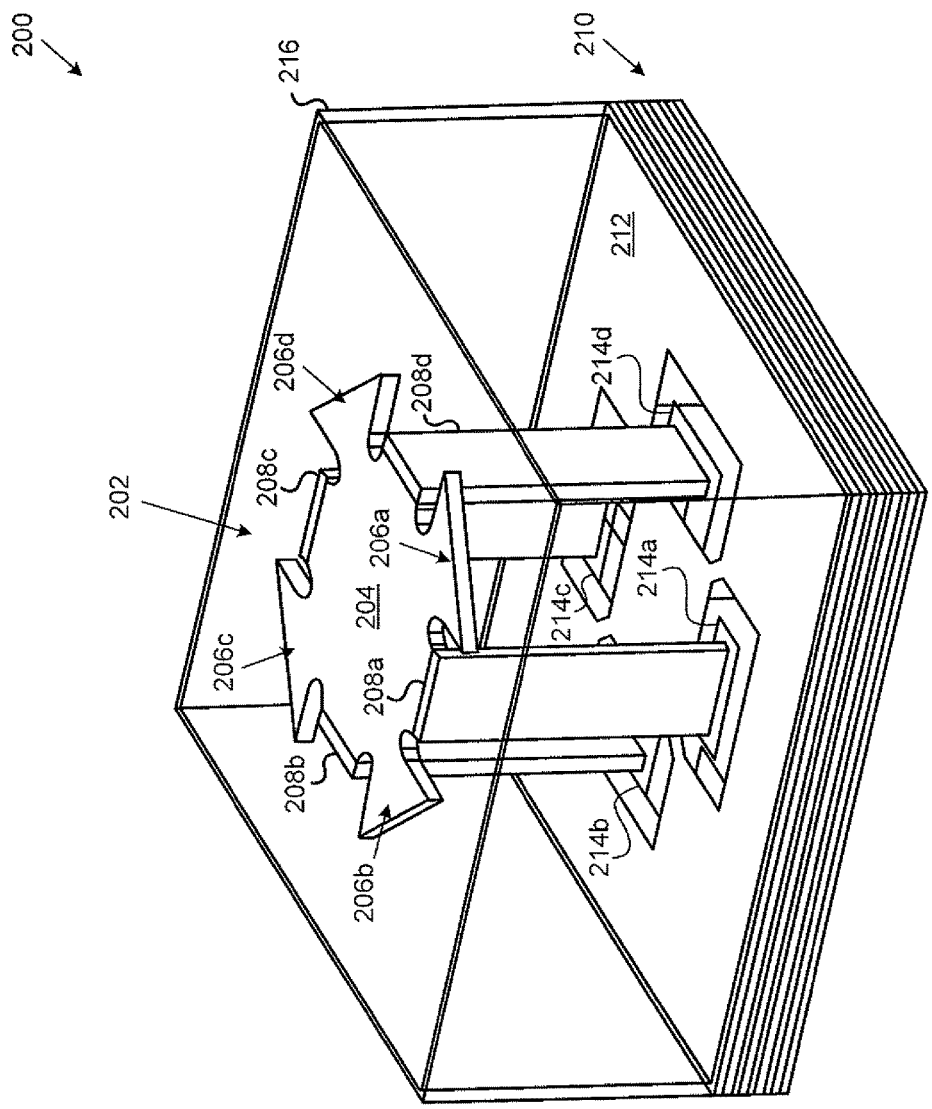
FIG. 2B illustrates a perspective view of an exemplary antenna cell according to one implementation of the present application.

FIG. 2B illustrates a perspective view of an exemplary antenna cell according to one implementation of the present application. As illustrated in FIG. 2B, antenna cell 200 includes raised antenna patch 202, having top plate 204 with projections 206a, 206b, 206c, and 206d, and supporting legs 208a, 208b, 208c, and 208d. Antenna cell 200 also includes substrate 210, ground plate 212, pads 214a, 214b, 214c, and 214d, and shielding fence 216. Antenna cell 200 in FIG. 2B may generally correspond to antenna cell 200 in FIG. 2A, except that antenna cell 200 in FIG. 2B includes shielding fence 216 housing antenna cell 200. Optionally including shielding fence 216 further improves matching conditions, and provides increased isolation between adjacent antenna cells (not shown in FIG. 2B), as discussed below.

FIG. 3 illustrates a side view of an exemplary antenna cell according to one implementation of the present application. Antenna cell 300 in FIG. 3 may generally correspond to antenna cell 200 in FIG. 2B. As illustrated in FIG. 3, antenna cell 300 includes raised antenna patch 302, having top plate 304 with projections 306a and 306b, and supporting legs 308a, 308b, and 308d. Antenna cell 300 also includes substrate 310, ground plate 312, pads 314a, 314b, and 314d, shielding fence 316, and vias 318a, 318b, and 318d. The side view provided by FIG. 3 shows a side view of antenna cell 300 seen through substrate 310 and shielding fence 316. Other features of antenna cell 300, such as additional projections and an additional supporting leg, pad, and via, are behind, for example, supporting leg 206a, and thus cannot be seen in the side view provided by FIG. 3. Substrate 310 may be, for example, a multi-layer printed circuit board (PCB). As illustrated in FIG. 3, supporting legs 308a, 308b, and 308d connect through pads 314a, 314b, and 314d respectively to vias 318a, 318b, and 318d respectively in an upper layer of substrate 310. Vias 318a, 318b, and 318*d* may connect to additional components in lower layers of substrate 310, as discussed below.

FIGS. 4A, 4B, and 4C illustrate a perspective view, a side view, and a top view, respectively, of an exemplary raised antenna patch according to one implementation of the present application. Raised antenna patch 402 may generally correspond to raised antenna patch 202 in FIG. 2B or raised antenna patch 302 in FIG. 3. As illustrated in FIGS. 4A, 4B, and 4C, raised antenna patch 402 includes top plate 404 with projections 406*a*, 406*b*, 406*c*, and 406*d*, and supporting legs 408*a*, 408*b*, 408*c*, and 408*d*.

As illustrated in FIGS. 4A, 4B, and 4C, supporting legs 408*a*, 408*b*, 408*c*, and 408*d* of raised antenna patch 402 are situated between a pair of adjacent projections. For example, supporting leg 408*a* is situated between adjacent projection 406*a* and adjacent projection 406*b*. Supporting legs 408*a*, 408*b*, 408*c*, and 408*d* extend from top plate 404 of raised antenna patch 402. When used in an antenna cell, such as antenna cell 200 in FIG. 2B, supporting legs 408*a*, 408*b*, 408*c*, and 408*d* may carry radio frequency (RF) signals between top plate 404 of raised antenna patch 402 and components in lower layers of substrate 210. Raised antenna patch 402 may be copper, stainless steel, or any other suitable material having good conductivity. Raised antenna patch 402 may be formed by bending a substantially flat copper patch at supporting legs 408*a*, 408*b*, 408*c*, and 408*d*. The flat patch may have relief cuts between projections 406*a*, 406*b*, 406*c*, and 406*d* and supporting legs 408*a*, 408*b*, 408*c*, and 408*d* in order to facilitate bending supporting legs 408*a*, 408*b*, 408*c*, and 408*d* without bending top plate 404. The flat patch may have thickness of approximately 0.15 millimeters. Thus, as illustrated in FIG. 4B, top plate 404 and supporting legs 408*a*, 408*b*, 408*c*, and 408*d* may have thickness T1 of approximately 0.15 millimeters. Top plate 404 may have width W1 of approximately 3.6 millimeters and supporting legs 408*a*, 408*b*, 408*c*, and 408*d* may have width W2 of approximately 0.8 millimeters. Raised antenna patch may have a height H1 of approximately 2.6 millimeters. The approximate dimensions of thickness T1, widths W1 and W2, and height H1 are solely to provide one example, and the present inventive concepts are in no way limited to the dimensions discussed.

As further shown in FIGS. 4A, 4B, and 4C, projections 406*a*, 406*b*, 406*c*, and 406*d* are situated between a pair of adjacent supporting legs and have outwardly increasing widths. For example, as shown in FIG. 4C, starting from between adjacent supporting legs 408*b* and 408*c*, projection 406*c* has inner width W3. Moving outward from the center of top plate 404, projection 406*c* has increased outer width W4. Outer width W4 may be, for example, 1.6 millimeters, while inner width W3 may be, for example, 0.6 millimeters. The approximate dimensions of widths W3 and W4 are solely to provide one example, and the present inventive concepts are in no way limited to the dimensions discussed.

When used in an antenna cell, such as antenna cell 200 in FIG. 2B, raised antenna patch 202/402 uses air as a dielectric between top plate 204/404 and ground plane 212. Raised antenna patch 202/402 using air as a dielectric, instead of using solid material (such as FR4) as a dielectric, presents several advantages. For example, air, unlike typical solid dielectrics, has no energy loss and thus increases efficiency. Moreover, since top plate 204/404 can have an increased height, the bandwidth of raised antenna patch 202/402 with air dielectric can be significantly improved without increasing manufacturing cost. Use of air as a dielectric is free of cost. In addition, during scanning operation, air does not result in formation of substrate guided waves since RF waves would not be trapped when air is used as a dielectric. Thus, raised antenna patch 202/402 decreases loss and increases efficiency.

FIGS. 5A and 5B illustrate a top view and a perspective view respectively of an exemplary matching network according to one implementation of the present application. As illustrated in FIGS. 5A and 5B, matching network 500 includes differential feed ports 520 and 522, differential transmission lines 524*a*, 524*b*, 524*c*, and 524*d*, vias 526*a*, 526*b*, 526*c*, and 526*d*, transformers 528*a*, 528*b*, 528*c*, and 528*d*, having segments 530*a*, 530*b*, 530*c*, and 530*d* and segments 532*a*, 532*b*, 532*c*, and 532*d* respectively, vias 518*a*, 518*b*, 518*c*, and 518*d*, and pads 514*a*, 514*b*, 514*c*, and 514*d*. When used in an antenna cell, such as antenna cell 200 in FIG. 2B, matching network 500 may be situated under raised antenna patch 202 in substrate 210.

As illustrated in FIGS. 5A and 5B, differential feed ports 520 and 522 are situated at a lower substrate level on two sides of matching network 500. Differential feed port 520 is situated on a side near pad 514*a*, and differential feed port 522 is situated on a side near pad 514*b*. Differential feed port 520 is connected to differential transmission lines 524*a* and 524*c*, and differential feed port 522 is connected to differential transmission lines 524*b* and 524*d*. Differential transmission lines 524*a*, 524*b*, 524*c*, and 524*d* extend inward past pads 514*a*, 514*b*, 514*c*, and 514*d* towards the center of matching network 500, and are connected to vias 526*a*, 526*b*, 526*c*, and 526*d* respectively. Vias 526*a*, 526*b*, 526*c*, and 526*d* raise differential transmission lines 524*a*, 524*b*, 524*c*, and 524*d* respectively to higher levels in a substrate, such as higher levels in substrate 210 in FIG. 2B. In the implementation shown in FIG. 5B, vias 526*b* and 526*d* raise differential transmission lines 524*b* and 524*d* to a level that is higher than the level that vias 526*a* and 526*c* raise differential transmission lines 524*a* and 524*c* to. Thus, transmission lines 524*b* and 524*d* may be situated in an upper layer while differential transmission lines 524*a* and 524*c* may be situated in a lower layer. Differential transmission lines 524*a*, 524*b*, 524*c*, and 524*d* extend inward to approximately the center of matching network 500 and are connected to transformers 528*a*, 528*b*, 528*c*, and 528*d* respectively. Transformers 528*b* and 528*d* are situated in the upper layer while transformers 528*a* and 528*c* are situated in the lower layer. In the present implementation, transformers 528*a*, 528*b*, 528*c*, and 528*d* extend at substantially right angles from transmission lines 524*a*, 524*b*, 524*c*, and 524*d* towards pads 514*a*, 514*b*, 514*c*, and 514*d*, and are connected to vias 518*a*, 518*b*, 518*c*, and 518*d* respectively. Vias 518*a*, 518*b*, and 518*d* in FIGS. 5A and 5B may generally correspond to vias 318*a*, 318*b*, and 318*d* in FIG. 3. Vias 518*a*, 518*b*, 518*c*, and 518*d* connect through pads 514*a*, 514*b*, 514*c*, and 514*d* respectively in an upper layer of the substrate to supporting legs of an overlying raised antenna patch, such as supporting legs 206*a*, 206*b*, 206*c*, and 206*d* respectively of raised antenna patch 202 in FIG. 2B. In the present implementation, differential feed ports 520 and 522 are connected to, for example, power amplifiers in RF front end chips (not shown in FIGS. 5A and 5B). Thus differential feed ports 520 and 522 may carry RF signals between supporting legs of a raised antenna patch and RF front end chips.

In various implementations, differential transmission lines 524*a*, 524*b*, 524*c*, and 524*d* extend inward towards the center of matching network 500 at angles other than those shown in FIGS. 5A and 5B. In one implementation, differential transmission lines 524*b* and 524*d* and transformers 528*b* and 528*d* may be situated in a lower layer of the substrate while differential transmission lines 524*a* and 524*c* and transformers 528*a* and 528*c* may be situated in an upper layer of the substrate. In various implementations transformers 528*a*, 528*b*, 528*c*, and 528*d* extend from transmission lines 524*a*, 524*b*, 524*c*, and 524*d* respectively at angles other than those shown in FIGS. 5A and 5B.

As further illustrated in FIGS. 5A and 5B, transformers 528*a*, 528*b*, 528*c*, and 528*d* have two segments. Specifically, transformer 528*a* has segments 530*a* and 532*a*, transformer 528*b* has segments 530*b* and 532*b*, transformer 528*c* has segments 530*c* and 532*c*, and transformer 528*d* has segments 530*d* and 532*d*. Transformers 528*a*, 528*b*, 528*c*, and 528*d* may be, for example, two-stage impedance transformers. Segments 530*a*, 530*b*, 530*c*, and 530*d* may correspond to first stages of the two-stage impedance transformers. Segments 532*a*, 532*b*, 532*c*, and 532*d* may correspond to second stages of the two-stage impedance transformers. In the present implementation, in transformers 528*a* and 528*c*, segments 530*a* and 530*c* are wider than segments 532*a* and 532*c*. Conversely, in transformers 528*b* and 528*d*, segments 530*b* and 530*d* are narrower than segments 532*b* and 532*d*. The widths of segments 530*a*, 530*b*, 530*c*, 530*d*, 532*a*, 532*b*, 532*c*, and 532*d* are chosen to compensate for different parasitics based on what level of the substrate the corresponding transformer is in. Segments 530*a*, 530*b*, 530*c*, 530*d*, 532*a*, 532*b*, 532*c*, and 532*d* are also structured to match differential feed ports 520 and 522 to the supporting legs of the raised antenna patch at a frequency of interest, such as a radio frequency in a 5G band. For example, in one implementation differential feed ports 520 and 522 may both have a differential impedance of about 100 ohms, and the raised antenna patch may have a characteristic impedance at a frequency of interest of 28.5 gigahertz. Although both feed ports 520 and 522 may have the same differential impedance, while transformers 528*a* and 528*c* may have different intermediate impedances than transformers 528*b* and 528*d* due to different relative segment widths, transformers 528*a* and 528*c* as well as transformers 528*b* and 528*d* can match the differential impedance (about 100 ohms) to the characteristic impedance of the raised antenna patch. In various implementations, segments 530*a*, 530*b*, 530*c*, 530*d*, 532*a*, 532*b*, 532*c*, and 532*d* may have combinations of widths other than those discussed above.

By using matching network 500 to provide impedance matching in conjunction with raised antenna patch 202 having improved matching over a large range of scan angles, antenna cell 200 further lowers return loss. Moreover, using transformers 528*a*, 528*b*, 528*c*, and 528*d* having segments 530*a*, 530*b*, 530*c*, and 530*d* and segments 532*a*, 532*b*, 532*c*, and 532*d* respectively increases bandwidth, particularly in 5G frequency bands. In addition, because transformers 528*a*, 528*b*, 528*c*, and 528*d* and differential transmission lines 524*a*, 524*b*, 524*c*, and 524*d* extend inward at different substrate levels such that matching network 500 feeds four supporting legs of raised antenna patch 202 using two differential feed ports, more space in substrate 210 between each adjacent raised antenna patch 202 is available for placing additional components, such as RF front end chips, power combiners, and a master chip, and for providing routing therebetween.

Figure 6:
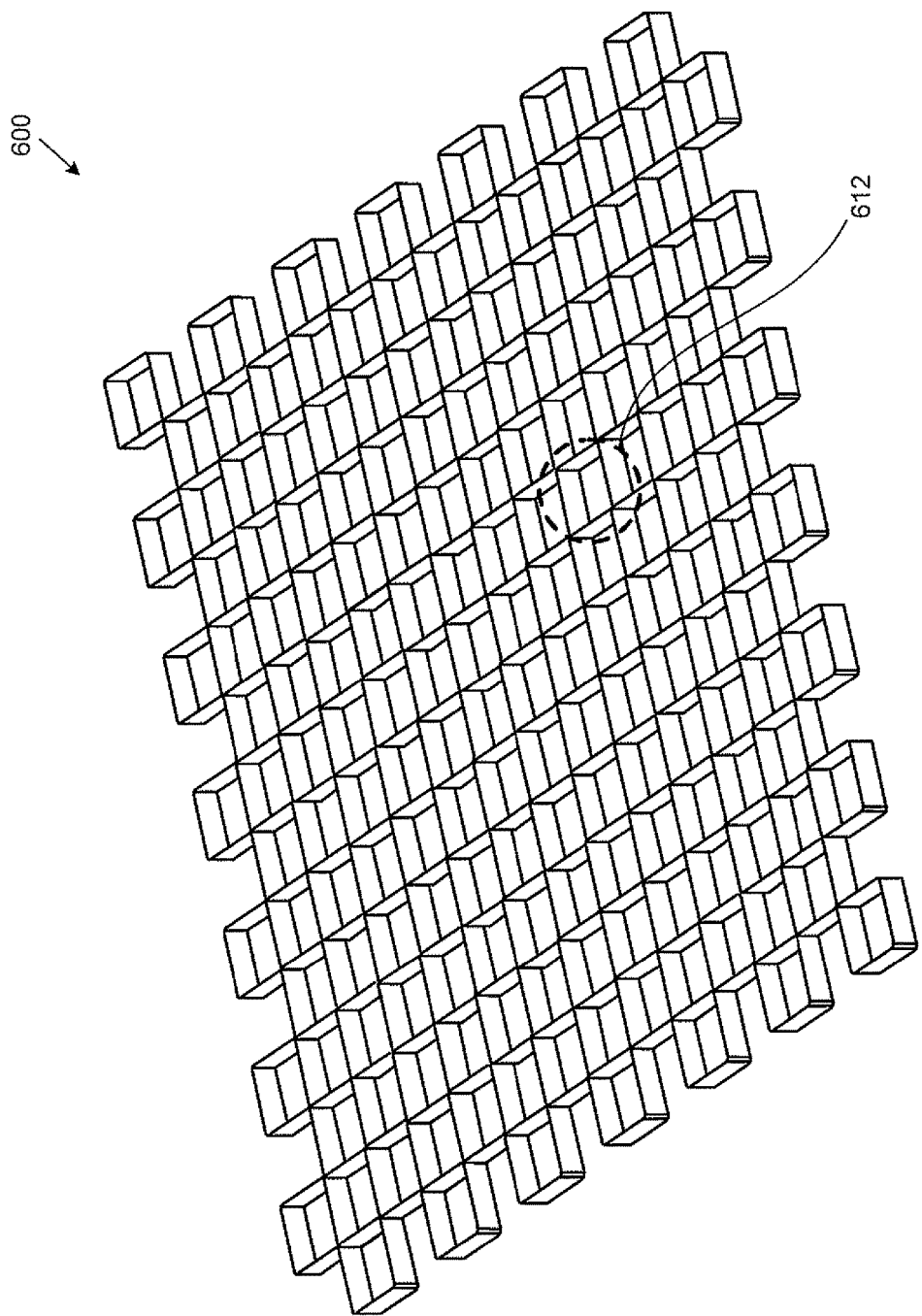
FIG. 6 illustrates an exemplary frame according to one implementation of the present application.

FIG. 6 illustrates an exemplary frame according to one implementation of the present application. As illustrated in FIG. 6, frame 600 includes multiple shielding fences 612. Each of shielding fences 612 in FIG. 6 can house an antenna cell, such as antenna cell 200 in FIG. 2A. In one example, each of shielding fences 612 may have an area of approximately 6 millimeters by 6 millimeters. In one example, frame 600 may have an area of approximately 84 millimeters by 84 millimeters. The approximate areas of thickness shielding fences 612 and frame 600 are solely to provide one example, and the present inventive concepts are in no way limited to the dimensions discussed. In various implementations, not all of shielding fences 612 in frame 600 house an antenna cell. For example, the outer shielding fences 612 may not house any antenna cells, while each of the inner shielding fences 612 house an antenna cell, thus frame 600 may house a 12 by 12 array of antenna cells. Frame 600 may be formed by arranging a plurality of long intersecting segments made of, for example, copper or any other suitable metal. Optionally using frame 600 with shielding fences 612 around antenna cells further contributes to improved scan range for a phased array antenna panel. For example, when frame 600 in FIG. 6 is used in conjunction with an antenna cells 200 in FIG. 2A, the phased array antenna panel can scan up to a scan angle θ of approximately 45 degrees without degrading matching conditions. In addition, frame 600 provides isolation between different antenna cells.

Figure 7:
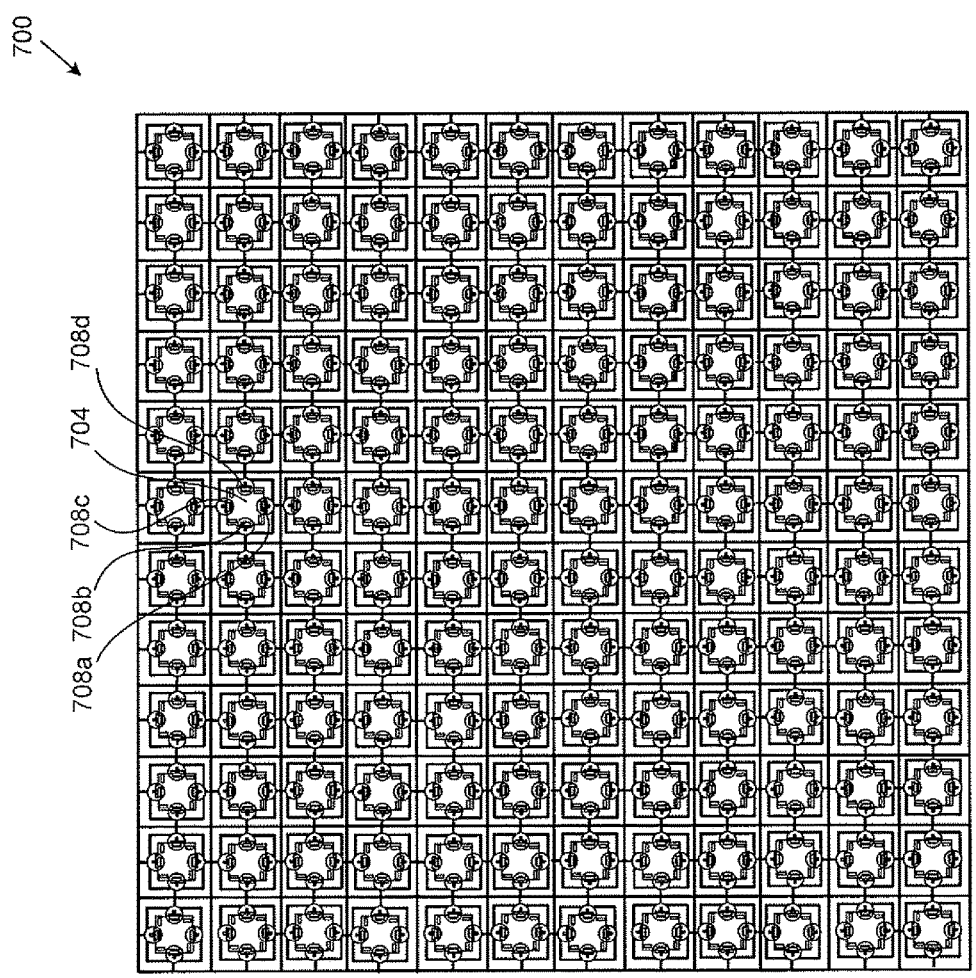
FIG. 7 illustrates a top view of a portion of an exemplary phased array antenna panel according to one implementation of the present application.

FIG. 7 illustrates a top view of a portion of an exemplary phased array antenna panel according to one implementation of the present application. FIG. 7 shows a phased array antenna panel where exemplary raised antenna patches are placed in a frame having shielding fences on the front side of a substrate. In the example of FIG. 7, one hundred and forty four (144) raised antenna patches are integrated in phased array antenna panel 700, arranged in 12 rows and 12 columns. Top plates 704 and supporting legs 708*a*, 708*b*, 708*c*, and 708*d* of the raised antenna patches can be seen in the top view provided by FIG. 7. Various other features of phased array antenna panel 700 are not shown to preserve focus on the present inventive concepts. For example, RF front end chips, a master chip, routing traces, and other components or features are not shown in FIG. 7. The RF front end chips and the master chip can be placed on the reverse side of the substrate and be connected to the front side through vias and traces. Raised antenna patches can be arranged either in a square format around a central point, such as around an RF front end chip (not shown in FIG. 7). Notably, due to the relatively large collective surface area of top plates 704, the raised antenna patches with air dielectrics can also be used as heat sinks to dissipate heat generated by, for example, RF front end chips, the master chip, power amplifiers, and other heat generating circuits or components. The 12 by 12 array is also particularly suitable for 5G applications, providing a gain of about 25 dBi. However, any other array size may be used. In various implementations, the raised antenna patches can be arranged in other formats, such as hexagonal, staggered rows, or triangular formats (instead of the square format shown in FIG. 7). In one implementation, the RF front end chips and the master chip (not shown) can reside on the front side of the substrate (instead of residing on the reverse side), along with the raised antenna patches.

Figure 8A:
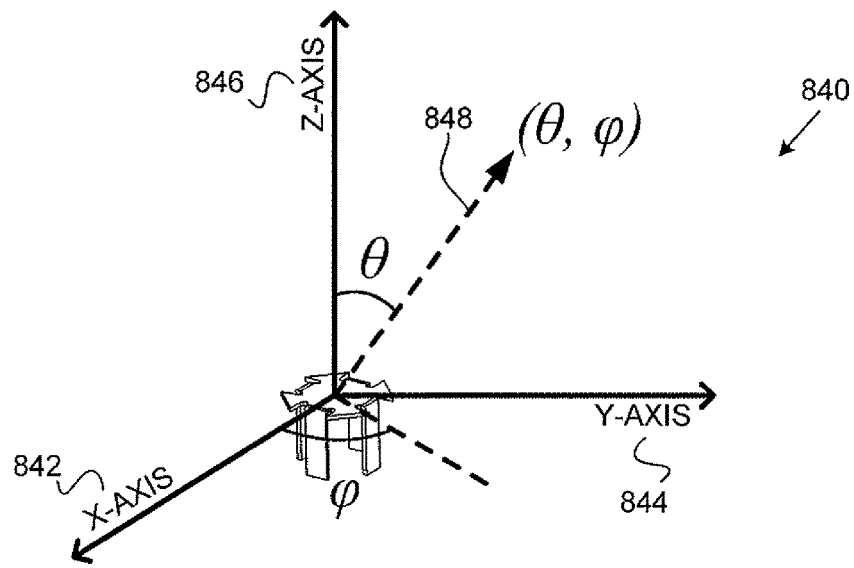
FIG. 8A illustrates a perspective view of a portion of an exemplary coordinate system in relation to one implementation of the present application.

FIG. 8A illustrates a perspective view of a portion of an exemplary coordinate system in relation to one implementation of the present application. As illustrated in FIG. 8A, coordinate system 840 includes x-axis 842, y-axis 844, and z-axis 846. Phased array antenna panel 700 in FIG. 7 lies in the xy-plane of FIG. 8A, defined by x-axis 842 and y-axis 844. Phased array antenna panel 700 is configured to transmit an RF beam in direction 848, defined by (θ, φ). As used herein, θ represents the angle from z-axis 846 to a transmitted or received RF beam, and φ represents the angle from x-axis 842 to the transmitted or received RF beam.

Figure 8B:
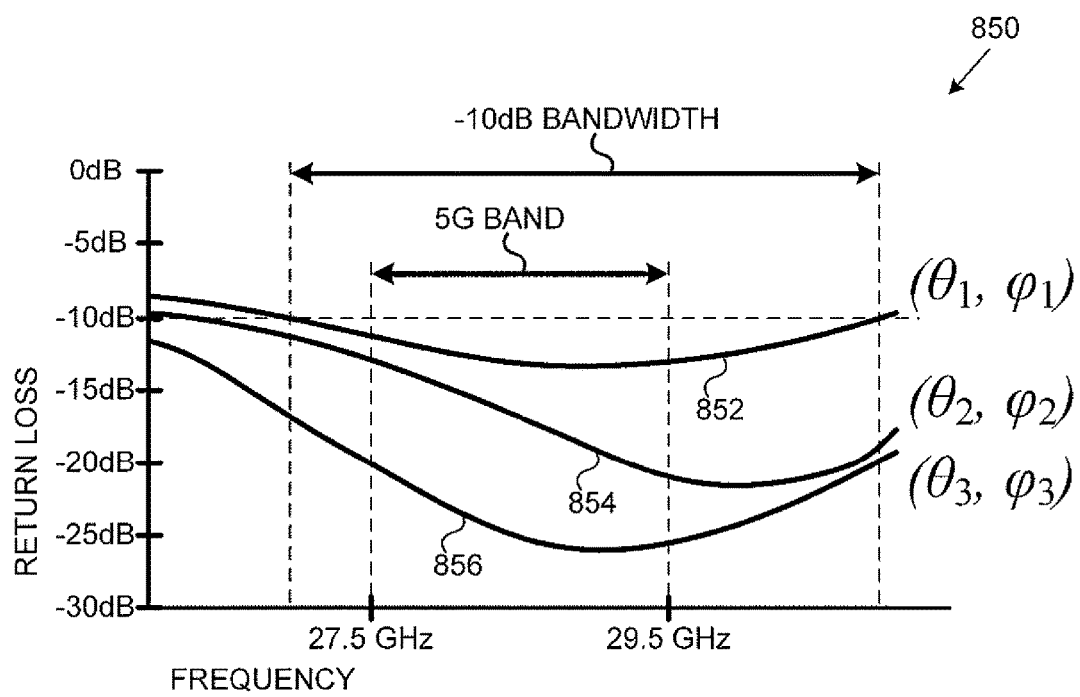
FIG. 8B illustrates a portion of an exemplary return loss graph according to one implementation of the present application.

FIG. 8B illustrates a portion of an exemplary return loss graph according to one implementation of the present application. Return loss graph 850 in FIG. 8B represents the return loss in decibels for each antenna element in a phased array antenna panel, such as phased array antenna panel 700 in FIG. 7, versus frequency in gigahertz for an RF beam. Relative dimensions of the return loss and frequency shown in FIG. 8B may be exaggerated for the purposes of illustration.

As illustrated in FIG. 8B, return loss graph 850 includes traces 852, 854, and 856. Traces 852, 854, and 856 represent the return losses of each antenna element measured during scanning or beamforming at different combination of θ and φ scan angles $(θ_1, φ_1)$, $(θ_2, φ_2)$, and $(θ_3, φ_3)$ respectively. A return loss below a certain threshold may be desirable for the phased array antenna panel design. FIG. 8B shows the "−10 dB bandwidth" (VSWR<2), representing a range of frequencies for which the return losses of traces 852, 854, and 856 are less than a design threshold, i.e., less than −10 decibels. Although a different design threshold may be chosen, −10 dB is a conventional threshold and corresponds to a very small return loss. In practice, the wide bandwidth, illustrated in FIG. 8B, indicates a significantly improved performance of the phased array antenna panel according to the various implementations of the present application.

FIG. 8B also shows 5G band, a frequency band of interest in 5G technology, having a frequency range from 27.5 gigahertz to 29.5 gigahertz. As illustrated in FIG. 8B, the −10 dB bandwidth for traces 852, 854, and 856 encompasses the 5G band. Although FIG. 8B shows traces 852, 854, and 856 corresponding to three combinations of θ and φ scan angles $(θ_1, φ_1)$, $(θ_2, φ_2)$, and $(θ_3, φ_3)$ respectively, the phased array antenna panel may scan to any other number of combinations of θ and φ scan angles, and trace 852 may correspond to the combination of θ and φ scan angles having the highest return loss for the phased array antenna panel. Accordingly, generally all combinations of θ and φ angles result in a very small return loss in the 5G band.

Return loss is directly related to the improved matching conditions of an antenna. The improved matching conditions, bandwidth, and scan range of the present application are attributed to factors such as the shape of the raised antenna patches, including, for example, the projections of the raised antenna patches, the use of air as a dielectric to obtain desired height at low cost, the matching network, and the shielding fences housing the antenna cells. Thus, various implementations of the present application achieve improved large scale integration of phased array antenna panels for use in 5G applications.

FIGS. 9A, 9B, 9C, and 9D illustrate perspective views and field distributions of an exemplary antenna cell operating at its fundamental mode according to one implementation of the present application. Antenna cell 900 in FIGS. 9A, 9B, 9C, and 9D may generally correspond to antenna cell 200 in FIG. 2B. As illustrated in FIGS. 9A, 9B, 9C, and 9D, supporting legs 908a, 908b, 908c, and 908d in antenna cell 900 may be fed differently to produce different polarizations, as shown by field distributions 960a, 960b, 960c, and 960d. In FIG. 9A, supporting legs 908a and 908c (corresponding to differential feed port 520 in FIGS. 5A and 5B) are fed ninety degrees out of phase from supporting legs 908b and 908d (corresponding to differential feed port 522 in FIGS. 5A and 5B), and field distribution 960a is circularly polarized. In FIG. 9B, only supporting legs 908a and 908c (corresponding to differential feed port 520 in FIGS. 5A and 5B) are fed, and field distribution 960b is vertically polarized. In FIG. 9C, only supporting legs 908b and 908d (corresponding to differential feed port 522 in FIGS. 5A and 5B) are fed, and field distribution 960c is horizontally polarized. In FIG. 9D, supporting legs 908a and 908c (corresponding to differential feed port 520 in FIGS. 5A and 5B) are fed one hundred and eighty degrees out of phase from supporting legs 908b and 908d (corresponding to differential feed port 522 in FIGS. 5A and 5B), and field distribution 960d is linearly polarized at forty five degrees. Thus, antenna cell 900 having supporting legs 908a, 908b, 908c, and 908d readily supports communication using various antenna polarizations.

Figure 10A:
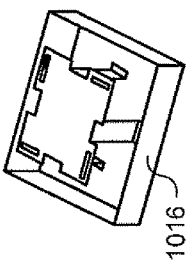
FIGS. 10A through 10I illustrate perspective views of exemplary antenna cells according to various implementations of the present application.
Figure 10D:
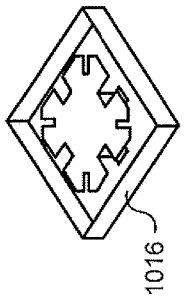
Figure 10G:
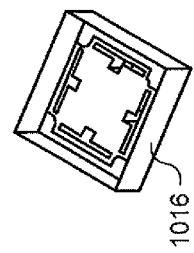
Figure 10B:
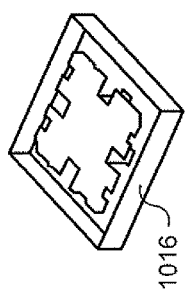
Figure 10E:
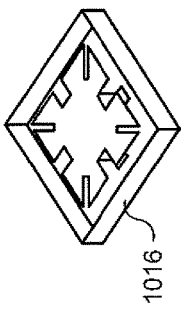
Figure 10H:
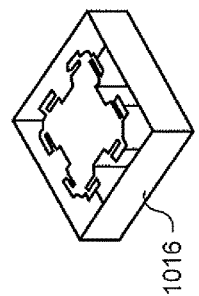
Figure 10C:
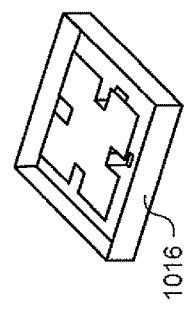
Figure 10F:
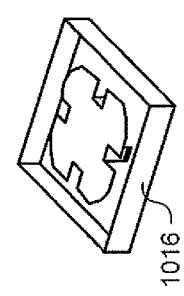
Figure 10I:
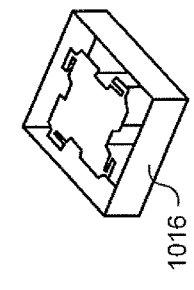
Figure 10J:
FIGS. 10J through 10R illustrate perspective views of exemplary antenna cells according to various implementations of the present application.
Figure 10K:
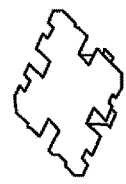
Figure 10L:
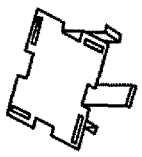
Figure 10M:
Figure 10N:
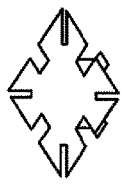
Figure 10O:
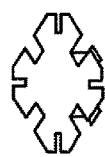
Figure 10P:
Figure 10Q:
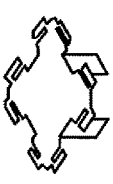
Figure 10R:
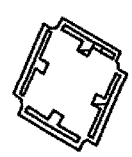

FIGS. 10A through 10I illustrate perspective views of exemplary antenna cells according to various implementations of the present application. FIGS. 10A through 10I show antenna cells having raised antenna patches with air dielectrics and projections of various configurations and geometries. FIG. 10A illustrates an antenna cell having a raised antenna patch with projections of an "uncut" implementation. FIG. 10B illustrates an antenna cell having a raised antenna patch with projections of a "teeth" implementation. FIG. 10C illustrates an antenna cell having a raised antenna patch with projections of a "side slots" implementation. FIG. 10D illustrates an antenna cell having a raised antenna patch with projections of a "diagonal cuts" implementation. FIG. 10E illustrates an antenna cell having a raised antenna patch with projections of a "slits" implementation. FIG. 10F illustrates an antenna cell having a raised antenna patch with projections of a "slits and cuts" implementation. FIG. 10G illustrates an antenna cell having a raised antenna patch with projections of a "flaps" implementation. FIG. 10H illustrates an antenna cell having a raised antenna patch with projections of a "double flaps" implementation. FIG. 10I illustrates an antenna cell having a raised antenna patch with projections of a "rings" implementation. The antenna cells shown in FIGS. 10A through 10I may have any of the advantages discussed above in relation to antenna cell 200 in FIG. 2B, such as improved matching conditions, bandwidth, heat dissipation, and scan range. In the implementations shown in FIGS. 10A through 10I, the antenna cells are housed by shielding fences 1016.

FIGS. 10J through 10R illustrate perspective views of exemplary antenna cells according to various implementations of the present application. FIGS. 10J through 10R may correspond to FIGS. 10A through 10I respectively except that, in the implementations shown in FIGS. 10J through 10R, the antenna cells may be used without shielding fences 1016. The antenna cells shown in FIGS. 10J through 10R may have any of the advantages discussed above in relation to antenna cell 200 in FIG. 2A, such as improved matching conditions, bandwidth, heat dissipation, and scan range.

Figure 11:
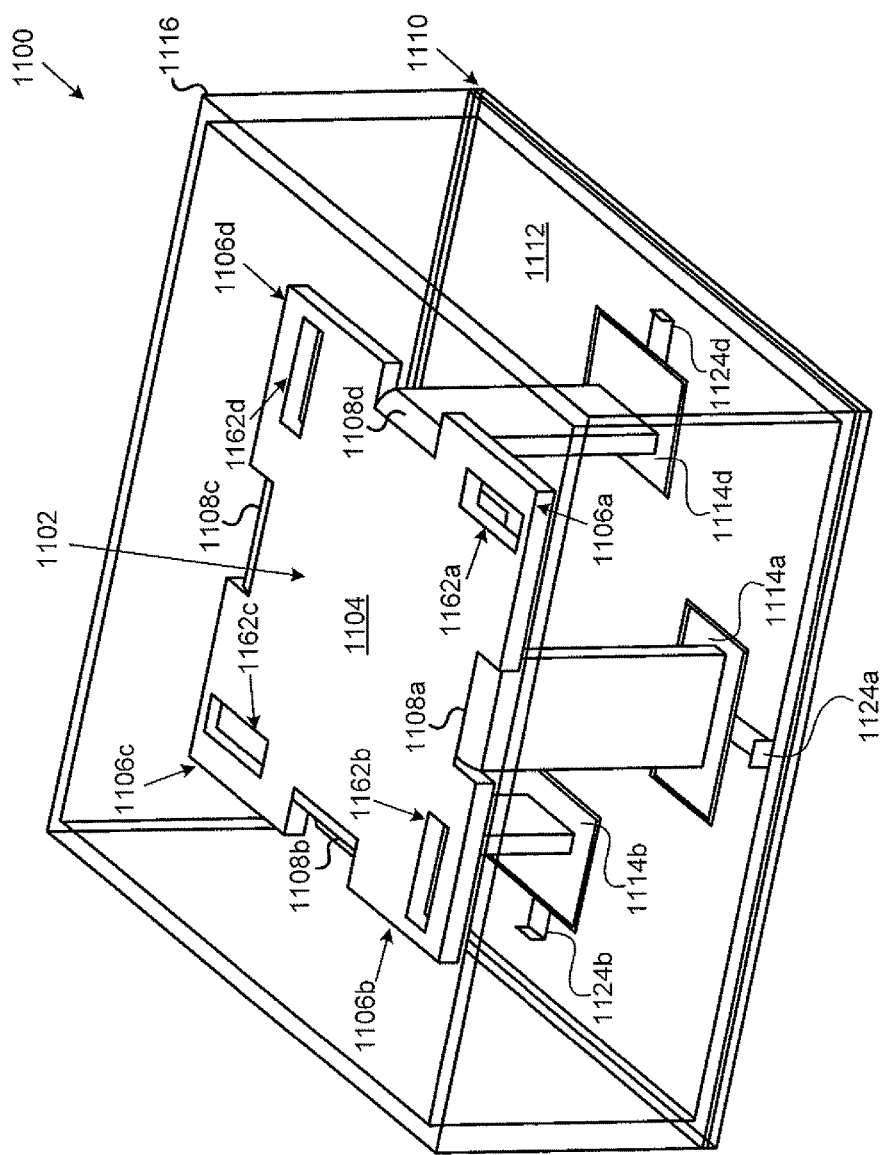
FIG. 11 illustrates a perspective view of an exemplary antenna cell according to one implementation of the present application.

FIG. 11 illustrates a perspective view of an exemplary antenna cell according to one implementation of the present application. Antenna cell 1100 in FIG. 11 may generally correspond to the "side slots" implementation shown in FIG. 10C. As illustrated in FIG. 11, antenna cell 1100 includes raised antenna patch 1102, having top plate 1104 with projections 1106a, 1106b, 1106c, and 1106d, and supporting legs 1108a, 1108b, 1108c, and 1108d. Antenna cell 1100 also includes substrate 1110, ground plate 1112, pads 1114a, 1114b, 1114c, and 1114d, shielding fence 1116, and differential transmission lines 1124a, 1124b, 1124c, and 1124d. In FIG. 11, differential transmission lines 1124a, 1124b, 1124c, and 1124d beneath supporting legs 1108a, 1108b, 1108c, and 1108d respectively extend outwards from under the center of top plate 1104, rather than inward—as was the case with respect to FIG. 5. Also in FIG. 11, after projections 1106a, 1106b, 1106c, and 1106d outwardly increase in width, projections 1106a, 1106b, 1106c, and 1106d outwardly decrease in width and converge to points. Projections 1106a, 1106b, 1106c, and 1106d have substantially rectangular slots 1162a, 1162b, 1162c, and 1162d respectively cut through them along one side of each projection. Each slot is rotated ninety degrees in its projection relative to slots in adjacent projections, such that slot 1162a is parallel to slot 1162c and slot 1162b is parallel to slot 1162d. Antenna cell 1100 in FIG. 11 may have any other implementations and advantages described above with respect to antenna cell 200 in FIGS. 2A and 2B.

Figure 12:
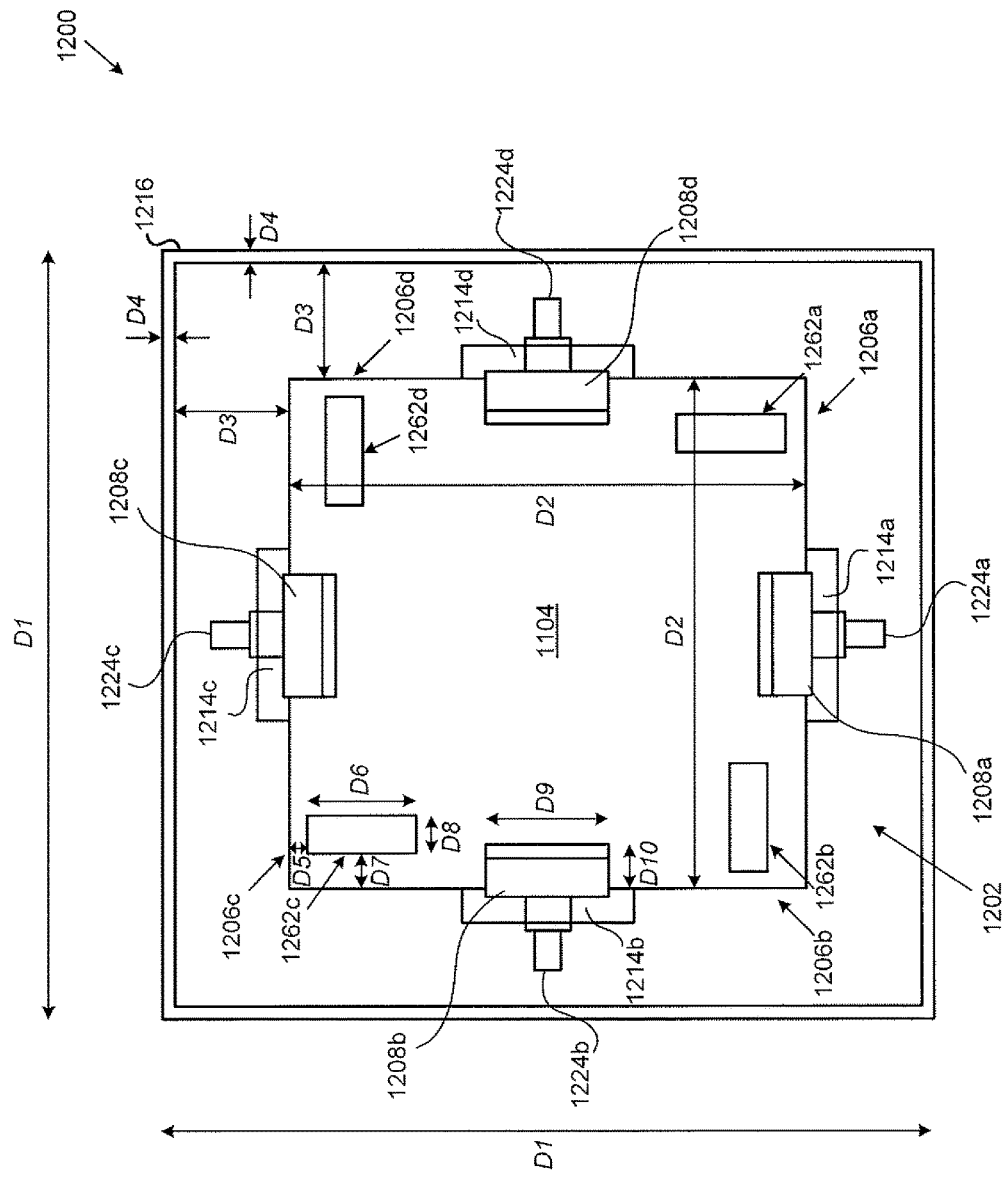
FIG. 12 illustrates a top view of an exemplary antenna cell according to one implementation of the present application.

FIG. 12 illustrates a top view of an exemplary antenna cell according to one implementation of the present application. Antenna cell 1200 in FIG. 12 may generally correspond to antenna cell 1100 in FIG. 11. As illustrated in FIG. 12, antenna cell 1200 includes raised antenna patch 1202, having top plate 1204 with projections 1206a, 1206b, 1206c, and 1206d, and supporting legs 1208a, 1208b, 1208c, and 1208d. Antenna cell 1200 also includes, ground plate 1212, pads 1214a, 1214b, 1214c, and 1214d, shielding fence 1216, and differential transmission lines 1224a, 1224b, 1224c, and 1224d. In one implementation, antenna cell 1200 has dimensions D1 through D10, approximately defined in table 1 below:

TABLE 1

| | |
|---|---|
| D1 | 5.855 mm |
| D2 | 3.9 mm |
| D3 | 0.875 mm |
| D4 | 0.1 mm |
| D5 | 0.142 mm |
| D6 | 0.82 mm |
| D7 | 0.277 mm |
| D8 | 0.296 mm |
| D9 | 0.923 mm |
| D10 | 0.35 mm |

The approximate dimensions of thickness D1 through D10 are solely to provide one example, and the present inventive concepts are in no way limited to the dimensions discussed. Antenna cell 1200 in FIG. 12 may have any other implementations and advantages described above with respect to antenna cell 1100 in FIG. 11.

Thus, various implementations of the present application achieve improved large scale integration of phased array antenna panels for use in 5G applications. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A phased array antenna panel comprising:
an array of antenna cells;
each antenna cell in said array of antenna cells comprising a raised antenna patch with air dielectric;
a first differential feed port coupled to a first and a second supporting leg of each raised antenna patch through first and second transformers;
a second differential feed port coupled to a third and a fourth supporting leg of each raised antenna patch through third and fourth transformers.

2. The phased array antenna panel of claim 1, wherein said raised antenna patch comprises four projections having outwardly increasing widths, each of said first, second, third, and fourth supporting legs being situated between a pair of adjacent projections.

3. The phased array antenna panel of claim 1, wherein said first and second transformers each have a first segment wider than a second segment.

4. The phased array antenna panel of claim 3, wherein said third and fourth transformers each have a first segment narrower than a second segment.

5. The phased array antenna panel of claim 1, wherein said third and fourth transformers each have a first segment narrower than a second segment.

6. The phased array antenna panel of claim 1, wherein said first and second transformers are situated in an upper layer of a printed circuit board, and said third and fourth transformers are situated in a lower layer of said printed circuit board.

7. The phased array antenna panel of claim 1, wherein said first and second supporting legs are connected to said first and second transformers through vias in a printed circuit board.

8. The phased array antenna panel of claim 1, wherein said third and fourth supporting legs are connected to said third and fourth transformers through vias in a printed circuit board.

9. The phased array antenna panel of claim 1, wherein a return loss in a frequency range of between 27.5 GHz and 29.5 GHz of at least one of said antenna cells is less than about −10 dB.

10. The phased array antenna panel of claim 1, wherein said raised antenna patch comprises a top plate, said top plate being situated over a ground plane in said antenna cell.

11. The phased array antenna panel of claim 1, wherein said array of antenna cells scans up to a θ scan angle of approximately 45 degrees without degrading a matching condition.

12. A phased array antenna panel comprising:
a frame with multiple shielding fences housing an array of antenna cells;
each antenna cell in said array of antenna cells comprising a raised antenna patch with air dielectric;
said raised antenna patch comprising four projections having outwardly increasing widths, and four supporting legs, each of said four supporting legs situated between a pair of adjacent projections;
wherein a return loss in a frequency range of between 27.5 GHz and 29.5 GHz of at least one of said antenna cells is less than about −10 dB.

13. The phased array antenna panel of claim 12, wherein said raised antenna patch comprises a top plate, said top plate being situated over a ground plane in said antenna cell.

14. The phased array antenna panel of claim 12, further comprising a first differential feed port coupled to two of said four supporting legs.

15. The phased array antenna panel of claim 14, further comprising a second differential feed port coupled to another two of said four supporting legs.

16. The phased array antenna panel of claim 12, wherein first and second transformers are situated in an upper layer of a printed circuit board, and third and fourth transformers are situated in a lower layer of said printed circuit board.

17. The phased array antenna panel of claim 16, wherein said first and second transformers each have a first segment wider than a second segment.

18. The phased array antenna panel of claim 17, wherein said third and fourth transformers each have a first segment narrower than a second segment.

19. The phased array antenna panel of claim 16, wherein said third and fourth transformers each have a first segment narrower than a second segment.

20. The phased array antenna panel of claim 12, wherein said array of antenna cells scans up to a $\theta$ scan angle of approximately 45 degrees without degrading a matching condition.

* * * * *